United States Patent [19]
Rulo Ralph P.

[11] 3,711,019
[45] Jan. 16, 1973

[54] WELDING AND BRAZING DEVICES

[76] Inventor: Rulo Ralph P., 10216 St. Arthur, St. Ann, Mo. 63074

[22] Filed: Feb. 5, 1970

[21] Appl. No.: 8,889

[52] U.S. Cl. ................228/56, 117/202, 219/145
[51] Int. Cl. .....................B23k 3/06, B23k 35/14
[58] Field of Search .....228/41, 56; 75/122; 219/145; 117/202; 126/236, 263

[56] References Cited

UNITED STATES PATENTS

| 934,711 | 9/1909 | Chapman | 228/56 |
|---|---|---|---|
| 3,308,532 | 3/1967 | Long et al. | 228/56 X |
| 2,745,368 | 5/1956 | Klein | 228/56 |
| 2,569,956 | 10/1951 | Schiltknecht | 126/263 |
| 2,024,991 | 12/1935 | Miller | 117/202 |

Primary Examiner—John F. Campbell
Assistant Examiner—R. J. Craig
Attorney—Roger M. Hibbits

[57] ABSTRACT

The present disclosure relates to devices for welding and is particularly useful for applications where it is desirable to carry a welding unit as an accessory to a motor vehicle for temporary welding repairs comprising, a housing, said housing constructed from suitable welding metal and provided with a chamber therein and provided with an outlet port from said chamber, heat producing means operably mounted within said chamber and hatch means operably mounted on said housing and disposed such that it covers or exposes said outlet port.

1 Claim, 3 Drawing Figures

PATENTED JAN 16 1973

3,711,019

Inventor
RALPH P. RULO
By Roger M. Hibbel
Attorney

WELDING AND BRAZING DEVICES

BACKGROUND OF THE INVENTION

It is often desirable to have available means for effecting immediate and temporary repairs to mobile machinery and equipment. This is especially difficult to achieve in situations where welding is required to accomplish the repairs.

An illustration of an application where this occurs quite often is in the military. Military vehicles are often damaged under circumstances which necessitate abandoning the vehicle either permanently or until repair facilities are available at the site of the damage or necessitates towing the vehicle to a repair depot. Risk of injury to the operator is increased if he attempts to operate the vehicle in its damaged condition. Damage to components relating to steering, axles, frame and body are among those which occur quite frequently.

To meet this need, prior art devices have been developed, however these devices are such as to require more than one part to be at the same location at the same time thus increasing logistics problems and operator training.

SUMMARY OF THE INVENTION

It is therefore an object of the present invention to provide a welding device of unitary construction which is both simply and economically manufactured and used.

It is a further object of the present invention to provide such a device wherein the housing which contains the heat producing means is constructed of a suitable material such that the housing serves the dual functions of containing the heat producing means and serves as the welding material.

A further object of the present invention is to utilize a suitable compound for the heat producing means such that it may be activated by either a match or exposure to the atmosphere.

These together with other objects and advantages, which will become subsequently apparent, reside in details and construction and operation as more fully hereinafter described and claimed, reference being had to the accompanying drawings forming a part hereof, wherein like numerals refer to like parts throughout, and in which;

DETAILED DESCRIPTION OF THE INVENTION

Figure 1:
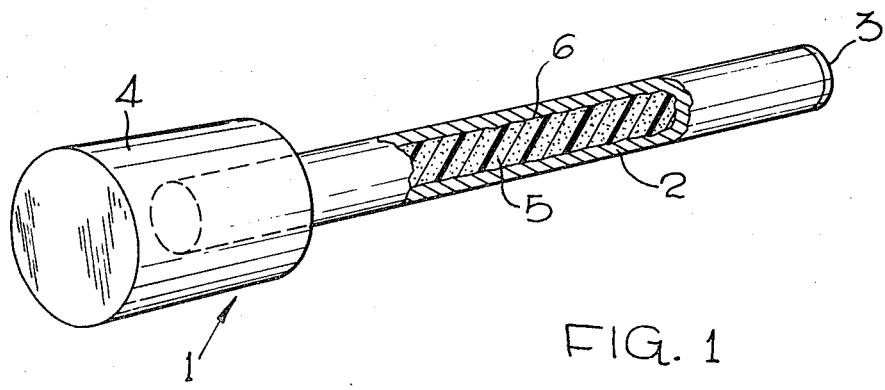
FIG. 1 is a sectional view of a welding device constructed in accordance with and embodying the present invention.

Referring now in more detail and by reference characters to the drawings which illustrate practical embodiments of the present invention, FIG. 1, is a sectional view of welding device, 1, constructed in accordance with and embodying the present invention.

Welding device, 1, is shown in FIG. 1, is seen to comprise elongated cylindrical member, 2, sealing means, 3, handle means, 4, and heat producing material, 5.

Figure 2:
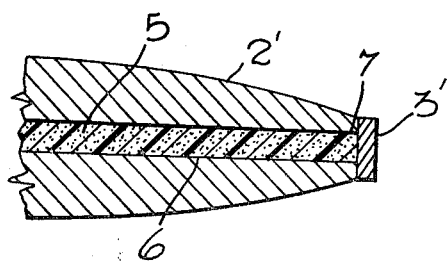
FIG. 2 is a fragmentary sectional view of another welding device constructed in accordance with and embodying the present invention.
Figure 3:
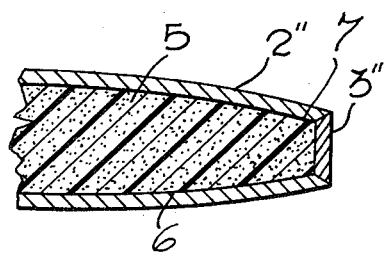
FIG. 3 is a fragmentary sectional view of another welding device constructed in accordance with and embodying the present invention.

Cylindrical member, 2, is provided with chamber, 6, said chamber being provided with outlet port, 7, which is shown in FIGS. 2 and 3. Pyrotechnic material, 5, is contained within chamber, 6, and sealed therein by sealing means, 3.

Various types of heat producing or pyrotechnic materials may be used in the present invention. Particular materials may be used which ignite upon exposure to atmosphere while others may be used which may be ignited by means of a spark or flame from a conventional match.

Handle means, 4, is merely provided as a convenient method for holding welding device, 1, while in use.

Cylindrical member, 2, is constructed of conventional welding or brazing material depending upon the particular application.

In the use of welding device, 1, sealing means, 3, is removed and heat producing material, 5, is ignited. As the heat producing material, 5, burns, the exterior end of elongated cylindrical member, 2, melts as heat is supplied simultaneously to member, 2, and the surface of a part being repaired.

Many different operations, such as brazing, welding, cutting, may be covered by simple variations in parameters such as the length or material of member, 2, or in the type of heat producing material being used. Welding device, 1, may be used under water as well as in the atmosphere.

As shown in FIGS. 2, and, 3, the exterior end of cylindrical member, 2, may be shaped to improved performance of welding device, 1.

It should be understood that changes and modifications in the form, construction, arrangement, and combination of the elements of the welding device and methods of making and using the same may be made and substituted for those herein shown and described without departing from the nature and principle of my invention.

Having thus described my invention what I claim and desire to secure by United States Letters Patent is:

1. A welding device comprising,
   an elongated rod, said rod provided with a an elongated chamber therein which extends the length of said rod and communicates with an outlet port at one end of said rod, said rod being constructed of conventional welding rod material,
   handle means operably mounted on the opposite end of said elongated rod,
   heat producing means operably disposed within said elongated chamber such that when said heat producing means is ignited heat is provided at said outlet port which may be directed and which progressively melts said rod from said outlet port to said handle, and
   removable sealing means operably mounted on said rod, said removable sealing means adapted to seal said chamber.

* * * * *